United States Patent [19]

Seaman

[11] Patent Number: 5,284,067
[45] Date of Patent: Feb. 8, 1994

[54] MANUAL TRANSMISSION SHAFT CENTER CONTROL SUPPORT DEVICE

[75] Inventor: Robert L. Seaman, Farmington Hills, Mich.

[73] Assignee: Borg-Warner Automotive, Inc., Sterling Heights, Mich.

[21] Appl. No.: 990,875

[22] Filed: Dec. 15, 1992

[51] Int. Cl.$^5$ ............................................ F16H 57/02
[52] U.S. Cl. .................................. 74/606 R; 475/246
[58] Field of Search ............. 74/606 R; 475/246, 334, 475/347, 348

[56] References Cited

U.S. PATENT DOCUMENTS

| | | | |
|---|---|---|---|
| 1,887,560 | 5/1931 | Matthews | 74/606 R |
| 2,227,589 | 1/1941 | Koster | 74/606 |
| 2,529,392 | 11/1950 | Herreshoff | 475/246 |
| 3,690,399 | 9/1972 | Bokovoy et al. | 475/246 |
| 4,114,477 | 9/1978 | Iverson | 475/264 |
| 4,628,768 | 12/1986 | Omura et al. | 74/745 |
| 5,058,456 | 10/1991 | Manrique et al. | 74/606 R |
| 5,058,459 | 10/1991 | Nemoto et al. | 74/606 R |
| 5,097,717 | 3/1992 | Bardoll | 74/606 R |
| 5,142,940 | 9/1992 | Hasegawa | 74/606 R |

Primary Examiner—Vinh T. Luong
Attorney, Agent, or Firm—Brooks & Kushman

[57] ABSTRACT

A gear transmission adapted for use in an engine-driven automotive vehicle includes a mainshaft and a countershaft, a transmission casing having axially spaced bearing support structures, meshing gear elements on the mainshaft and countershaft to establish torque flow paths, and a support having first and second bearing openings therein through which the mainshaft and countershaft extend whereby the mainshaft and countershaft are supported intermediate the ends of the mainshaft and countershaft so that center distance between the shafts is maintained as is the center distance of meshing gears notwithstanding gear tooth separating forces acting transversely with respect thereto.

8 Claims, 3 Drawing Sheets

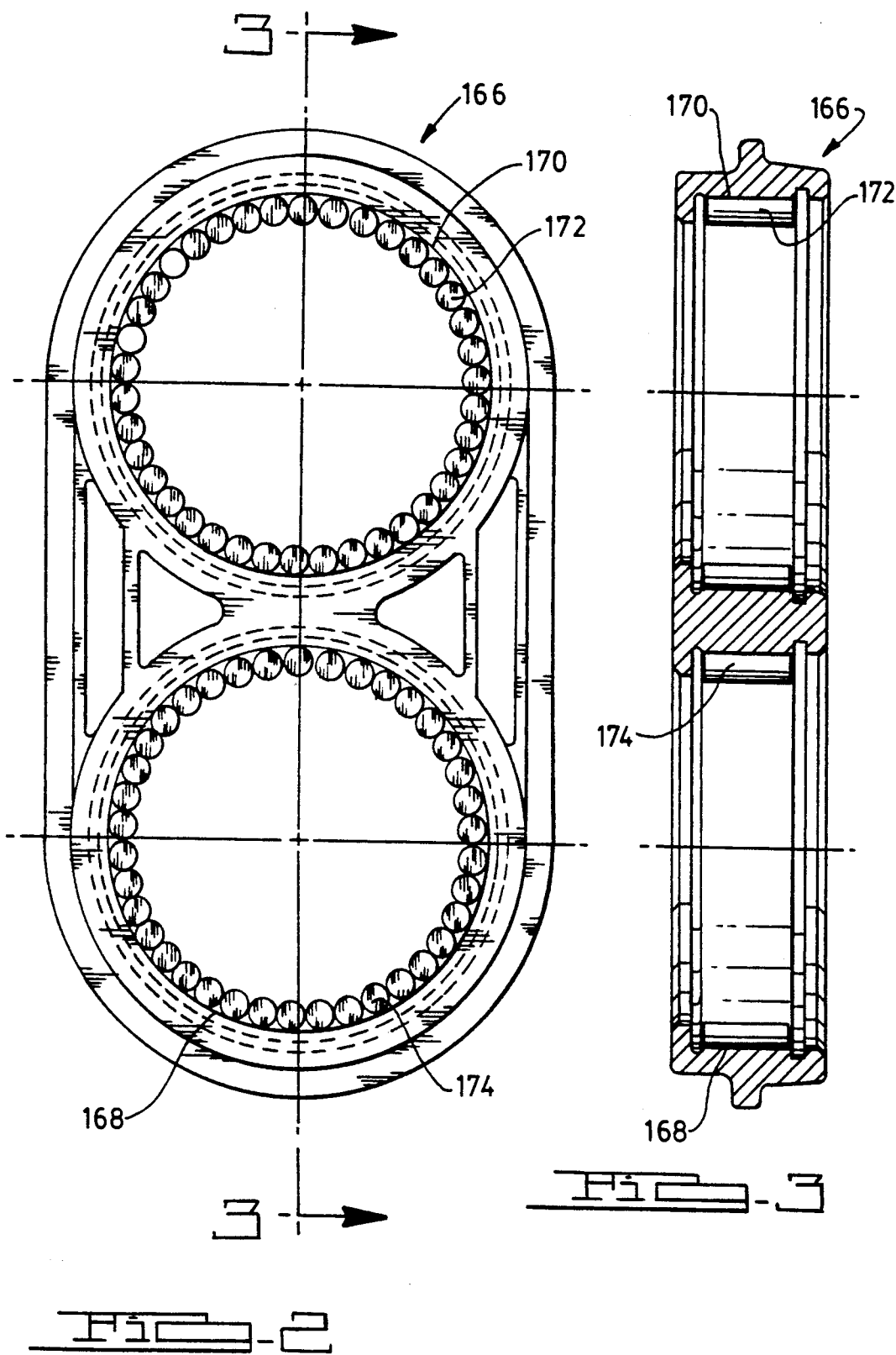

1

MANUAL TRANSMISSION SHAFT CENTER CONTROL SUPPORT DEVICE

TECHNICAL FIELD

This invention relates to automobile vehicle manual transmissions and more particularly to means for maintaining shaft spacing and meshing gear center distance and alignment in long shaft transmissions.

BACKGROUND ART

Conventional manual transmissions have gearing adapted to establish multiple torque ratios in a driveline for an automotive vehicle. These transmissions typically have two or more shafts, such as a mainshaft and at least one countershaft. Torque delivery gears are mounted for rotation about the mainshaft axis and gear elements are mounted for rotation about the countershaft axis. As the number of possible torque ratios has increased, with many transmissions having five forward speed ratios and one reverse ratio, shaft lengths have increased to accommodate an increased number of gears.

Initially, these long shafts were supported only by their ends. Under the gear loads encountered during rotational gear engagement, these shafts tend to torsionally deflect and bend. This deflection and bending adversely affects proper gear mesh. This contributes to gear tooth wear, gearing inefficiency and gear noise. To solve this problem, some prior art transmissions include a bearing support mounted on the transmission case between the end shaft supports to provide additional shaft support and thus to reduce deflections and stabilizing the shafts. Some of these supports are found in U.S. Pat. Nos. 4,628,768; 2,227,589; and U.S. Pat. No. 1,887,560.

The use of such a center bearing support, however, requires precise alignment between the shaft end supports and the center bearing support. This, in turn, requires machining tolerances of an exacting nature and an impractical, idealized transmission case. In actual practice, shafts supported by a fixed center support and the associated gearing may self-destruct at high speed because of improper alignment.

DISCLOSURE OF INVENTION

An object of the present invention is provide an improved manual transmission having a shaft-mounted support that maintains the constant distance between rotating shafts.

Another object of the present invention to provide an improved manual transmission having a shaft-mounted support intermediate shaft end supports that maintains the center distance of adjacent shafts and corresponding meshing gears to improve shaft life and reduce gear noise.

A further object of the present invention is to provide an improved manual transmission having a shaft-mounted support intermediate shaft end supports that eliminates three bearing alignment problems on long shaft transmissions.

In carrying the above objects and other objects of the invention, a manual gear transmission adapted to transmit torque in one direction between a driving member and a driven member includes a mainshaft and a countershaft. The mainshaft is adapted to be connected to the driving member, and the mainshaft and countershaft have offset axes.

A transmission casing having axially spaced bearing support structures connected thereto mounts the mainshaft and countershaft therein. Meshing gear elements mounted on the mainshaft and countershaft are selectably engageable to establish torque flow paths.

A shaft-mounted support having first and second bearing openings therein is mounted on the mainshaft and on the countershaft intermediate the axially spaced bearing support structures. The mainshaft and the countershaft each extend through a bearing opening in the shaft-mounted support and are thereby supported intermed the ends of the mainshaft and countershaft. Such a shaft-mounted support maintains the center distance of meshing gears on the mainshaft and the countershaft notwithstanding gear tooth separating forces acting transversely with respect to the mainshaft or countershaft.

The shaft-mounted support may be machined in special machining fixtures independently of machining operations in the casing. Thereby, the mainshaft and countershaft bearings may be pre-assembled in the shaft-mounted supports as part of a sub-assembly procedure during the transmission assembly operation.

The objects, features and advantages of the present invention are readily apparent from the following detailed description of the best mode for carrying out the invention when taken in connection with the accompanying drawings.

BRIEF DESCRIPTION OF THE DRAWINGS

FIG. 2 is a cross-sectional view taken along lines 2—2 in FIG. 1, illustrating a support for maintaining the center distance of a mainshaft and countershaft and corresponding meshing gears mounted thereon; and FIG. 3 is a cross-sectional view of the support taken along lines 3—3 in FIG. 2.

BEST MODE FOR CARRYING OUT THE INVENTION

Figure 1A:
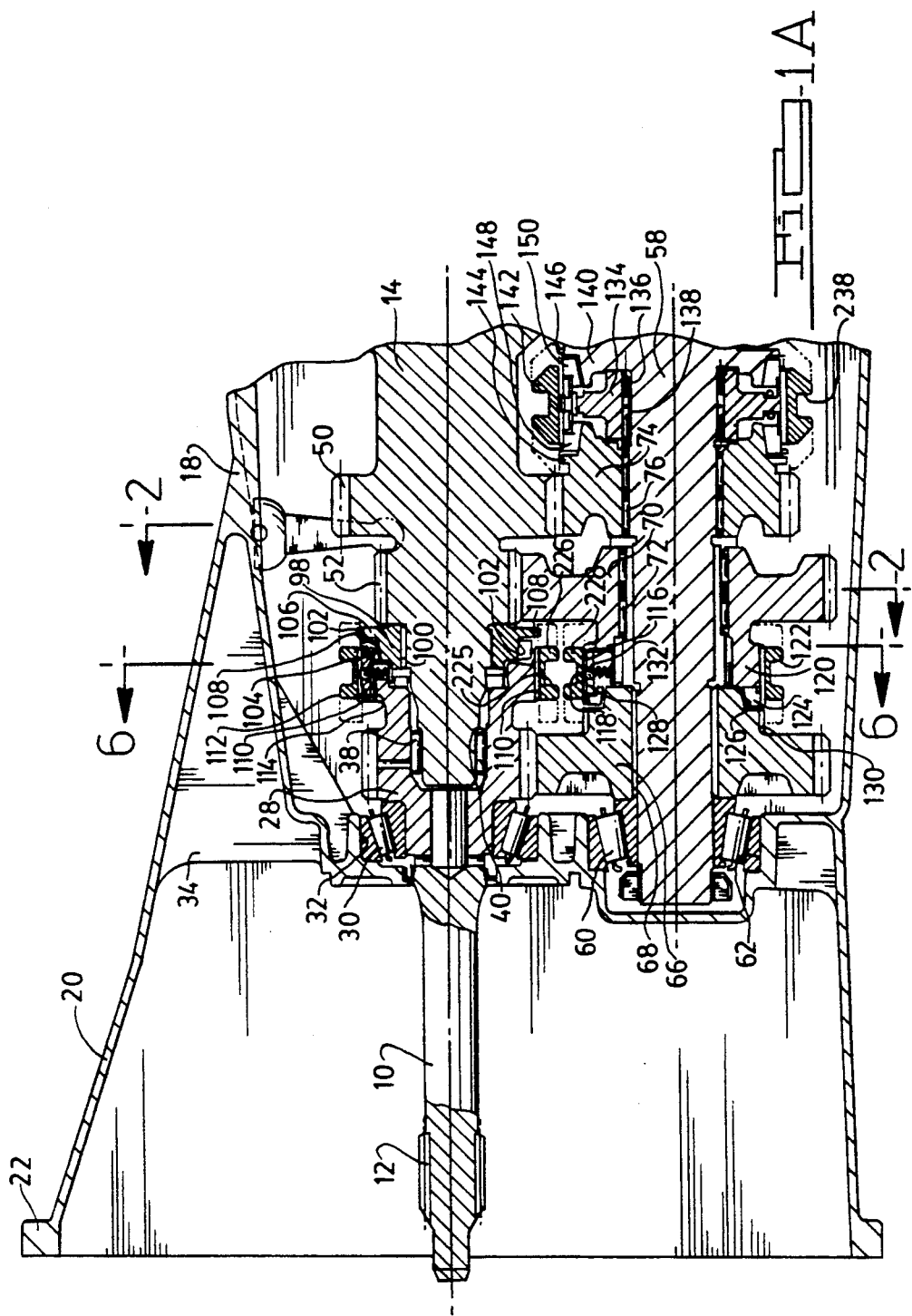
FIGS. 1A and 1B, taken together, show a cross-sectional side view of an improved manual gear transmission constructed in accordance with the present invention.

FIGS. 1A and 1B of the drawings show an improved manual transmission for an automotive vehicle constructed in accordance with the present invention. It is used to transmit torque between a driving member and a driven member in a vehicle driveline. As is more fully hereinafter described, the improved transmission has a shaft-mounted center support that maintains transmission shaft spacing thereby reducing gear noise and increasing transmission reliability. The shaft-mounted center support is herein described in connection with a manual transmission having five forward speed ratios and one reverse speed ratio. However, the shaft-mounted center support is applicable for use in any manual transmission where shaft support intermediate end supports is required.

Shown in FIG. 1A is a torque input shaft 10 which is splined at 12 to permit a driving connection between the shaft 10, which defines the driving member and the hub of a clutch plate that forms a part of a driver-operated neutral clutch and flywheel assembly. The engine crankshaft is connected to the shaft 10 through the neutral clutch and flywheel assembly.

A driven shaft for main shaft 14, shown in FIG. 1B, is splined at 16 to permit a driving connection with a drive yoke 17, which defines the driven member and forms a part of a universal joint connection between the shaft 14 and a driveshaft. Torque is delivered to the vehicle traction wheels through the driveshaft and through the differential and axle mechanism.

Figure 1:
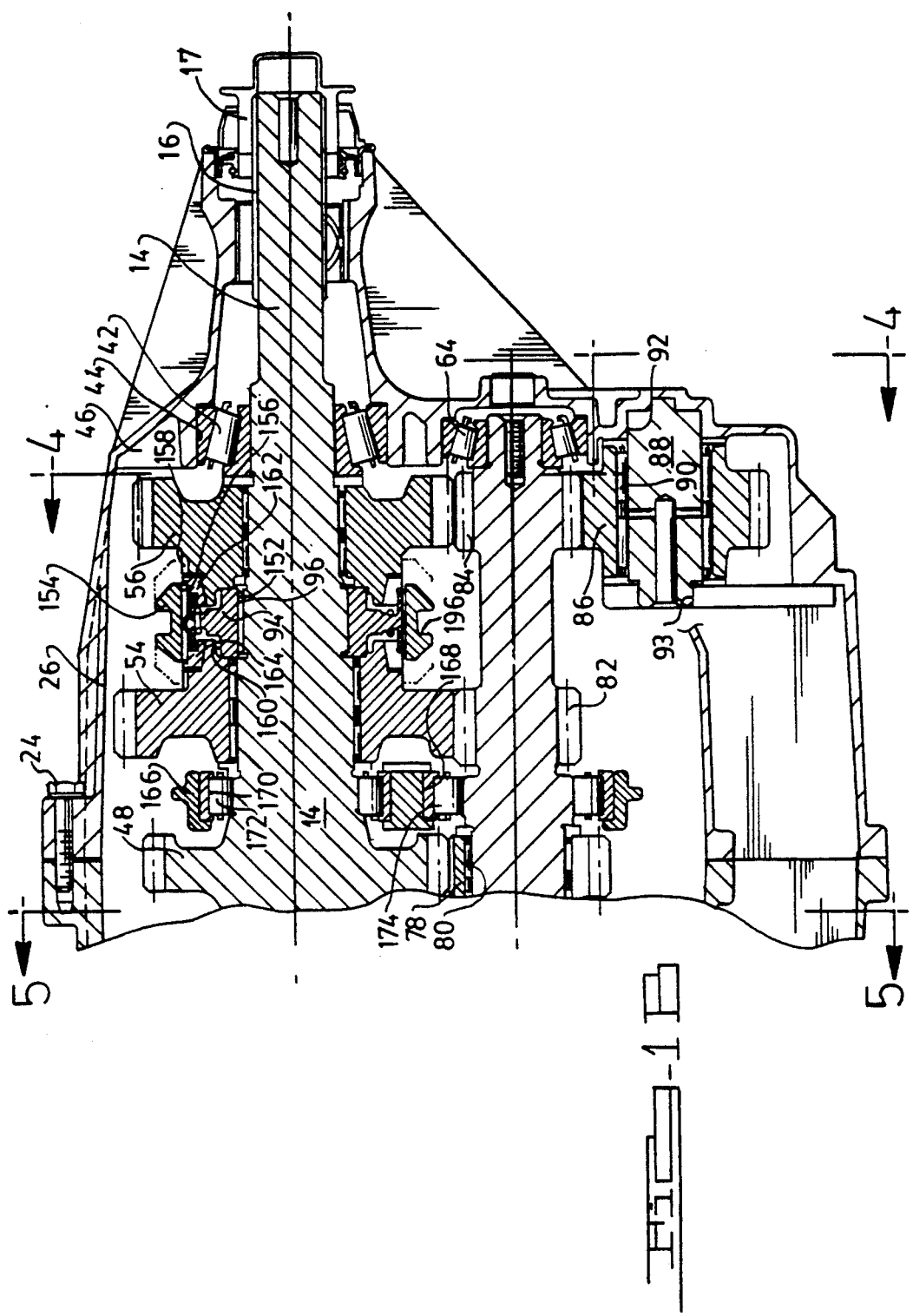

The transmission of FIG. 1 includes a cast housing 18 having a clutch bell housing portion 20 adapted to be bolted or otherwise secured at its periphery 22 to the engine block of an internal combustion vehicle engine.

The housing 18 is secured by bolts 24 to one end of a companion housing portion 26, which encloses portions of the transmission gearing, to be described subsequently, and the driven shaft 14. The housing portions 18 and 26 form a unitary casing or housing assembly.

A torque input gear 28 is connected to or formed integrally with the torque input shaft 10. It is journalled by tapered roller bearings 30 in a bearing opening 32 formed in forward wall portion 34 of the transmission housing 18.

The transmission mainshaft 14 extends through the housing portions 18 an 26 in coaxial disposition with respect to the axis of torque input shaft 10. It is journalled by bearing 38 in bearing opening 40 formed in the input gear 28. It is supported at the output side of the transmission by tapered roller bearing 42, which is received in bearing opening 44 of end wall 46 for the transmission housing portion 26. Bearings 38 and 42 define axially spaced bearing support structures which support the main shaft 14.

The mainshaft 14 is quite long as it has formed thereon a second ratio gear 48, a third ratio gear 50, and a fifth ratio gear or overdrive gear 52. Rotatably journalled on the right-hand side of the mainshaft 14 is a first ratio gear 54 and a reverse-drive gear 56 as seen in FIG. 1B. Mainshaft 14 is subjected to significant bending and torsional deflection forces. Without an intermediate support, the bending and torsional deflection of the mainshaft due to these forces would be a function of the shaft length.

A countershaft 58 is end supported in 15 parallel disposition with respect to the mainshaft 14 Countershaft 58 is also relatively long as it includes gearing that complements the gearing of mainshaft 14, Countershaft 58 is journalled at its left-hand end by tapered roller bearings 60 disposed in bearing opening 62 formed in the transmission bearing support wall 34. The right-hand end of the countershaft 58 is supported by a tapered roller bearing 64 in the right-hand bearing support wall 46 of the housing portion 26. Bearings 60 and 64 define axially spaced bearing supports which support the countershaft 58. An input gear element 66 is splined at 68 to the countershaft 58. It meshes with torque input gear 28.

An overdrive gear element 70 is journalled by bearing 72 on the countershaft 58. A third ratio gear element 74 is journalled by bearing 76 on countershaft 58. A second ratio gear element 78 is journalled on countershaft 58 by bearing 80.

A first ratio gear element 82 is formed on or is directly connected to countershaft 58. It meshes continuously with first ratio gear 54. Similarly, gear element 78 meshes continuously with second ratio gear 48.

A reverse drive gear element 84 is formed on or is connected integrally with the countershaft 58. This reverse gear arrangement also adds to the length of countershaft 58. Reverse drive gear element 84 meshes continuously with reverse-drive pinion 86, which is rotatably supported on pinion shaft 88 by bearing 90. Pinion shaft 88 is end supported in openings 92 and 93 formed in support walls that comprise a part of the housing portion 26.

In the view of FIG. 1B, reverse drive pinion 86 is shown out of position angularly with respect to the positions of the mainshaft and the countershaft. This is done for purposes of clarity. Actually, reverse drive pinion 86 meshes with reverse drive gear 56 journalled on the mainshaft.

A first and reverse synchronizer clutch hub 94 is splined at 96 to the mainshaft 14. A fourth and fifth ratio synchronizer clutch hub 98 is splined at 100 to the left-hand end of the mainshaft 14.

The clutch hub 98 has formed thereon a synchronizer cone clutch surface 102 that is adapted to be engaged by a synchronizer blocker ring 104. Hub 98 carries clutch teeth 106 which are aligned axially with respect to synchronizer blocker ring teeth 108. These teeth 108 and synchronizer clutch teeth 106 are engageable with internal clutch teeth 110 formed in synchronizer clutch sleeve 112. Input gear 28 carries external clutch teeth 114 which register with internal clutch teeth 110 of the synchronizer sleeve 112. When the sleeve 112 is shifted in the right-hand direction, the synchronizer sleeve forms a driving connection between input gear 28 and synchronizer clutch hub 98, thus establishing a direct driving connection between input shaft 10 and the mainshaft 14.

A thrust bar 116 engages blocker ring 104 when the sleeve 112 is shifted in the right-hand direction. The synchronizer detent 118 establishes a blocker ring engaging force as the synchronizer clutch sleeve 112 is shifted in a right-hand direction. When the synchronizer sleeve 112 is shifted in a left-hand direction, gear 28 is disengaged from synchronizer hub 98, thus disabling the torque flow path during fourth ratio operation.

A synchronizer clutch hub 120 is formed on fifth ratio gear element 70. A synchronizer clutch sleeve 122 having internal clutch teeth registers with the external teeth of the hub 120. A synchronizer blocker ring 124 is formed with a cone surface that engages cone synchronizer clutch cone surface 126 formed on the hub of input gear element 66. Thrust bars 128 engage the blocker ring 124 and exert a clutch engaging force in the left-hand axial direction as the sleeve 122 is shifted in the left-hand direction. This establishes a driving connection between input gear element 66 and the countershaft 58. The driving connection is established by external clutch teeth 130 formed on the hub of gear element 66 which engages the internal teeth of the clutch sleeve 122 after the clutch sleeve teeth passes through the blocker ring teeth of the blocker ring 124. The synchronizer clutch engaging force acting on the blocker ring 124 is established by spring-loaded detent ball 132.

The 2-3 synchronizer clutch hub 134 is splined at 136 to the countershaft 158 as seen in FIG. 1A. It is located adjacent synchronizer cone clutch elements 138 and 140 carried by the third ratio gear element 74 and the second ratio gear element 78, respectively. A 2-3 synchronizer clutch sleeve 142 is slidably supported on the hub 134, the latter being formed with internal clutch teeth that engage synchronizer clutch teeth 144 and 146 formed on the gear elements 74 and 78, respectively. As in the case of the synchronizer clutch construction described with reference to the input gear 28 and the overdrive gear 52, the 2-3 synchronizer clutch assembly includes a pair of blocker rings, as shown at 148 and 150, having internal cone clutch surfaces that engage external cone clutch surfaces on the hubs of the gears 74 and 78 as the sleeve 142 is shifted.

First and reverse synchronizer clutch hub 94 is splined at 152 to mainshaft 36. The first and reverse synchronizer clutch sleeve 154 is slidably positioned on the hub 94. When it is shifted in a right-hand direction, its internal teeth 156 engage external teeth 158 on reverse gear 56. When the sleeve 154 is shifted in the left-hand direction, its internal teeth drivably engage external teeth 160 on first ratio gear 54. Blocker ring 162 establishes synchronism in the usual fashion between the main shaft 14 and gear 56 as it is shifted in the right-hand direction and blocker ring 164 similarly establishes synchronism between the main shaft 14 and the first ratio gear 54 as the sleeve 154 is shifted in the left-hand direction.

A bearing support 166 in the form of a girdle has two bearing openings 168 and 170. Bearing support 166 is best seen in FIG. 2. Countershaft 58 extends through bearing opening 168, and mainshaft 36 extends through opening 170. Mainshaft 14 is supported in the bearing girdle 166 by the intermediate bearing 172, and countershaft 58 is supported in the opening 168 by intermediate bearing 174. Preferably, the bearings 172, 174 are roller bearings. The bearing girdle 166 establishes a restraint against separation of the axes of the mainshaft 14 and the countershaft 58, thus opposing the tendency of the gear tooth mesh radial separating force components to bend the countershaft and to bend the mainshaft.

As shown in FIG. 2, support 166 is of a one piece fabricated construction wherein the desired shaft center distance is controlled during fabrication of the bearing openings 168, 170. Preferably, support 166 is made from aluminum material.

As support 166 maintains the center distance of meshing gears on the mainshaft 14 and the countershaft 58, it thereby reduces gear noise. Furthermore, support 166 also eliminates the problems of alignment encountered in transmissions having a center bearing support mounted within or formed on the transmission housing.

While the best mode for carrying out the invention has been described in detail, those familiar with the art to which this invention relates will recognize alternative ways for practicing the invention as defined by the following claims.

I claim:

1. A gear transmission adapted to transmit torque between a driving member and a driven member, said transmission comprising:

a mainshaft and a countershaft, said mainshaft being adapted to be connected to said driving member, said mainshaft and said countershaft having offset axes;

a transmission casing having axially spaced bearing support structures connected thereto;

meshing gear elements on said mainshaft and countershaft establishing torque flow paths; and a shaft-mounted support having first and second bearing openings therein, said shaft-mounted support being independent of said casing and freely movable relative thereto, said mainshaft and said countershaft extending through said openings and being supported by said shaft-mounted support intermediate center-distance of said mainshaft and said countershaft is maintained as is the center-distance of said meshing gear elements notwithstanding gear tooth separating forces acting transversely with respect thereto.

2. A gear transmission as in claim 1 wherein the mainshaft is adapted to be connected to said driving member at one end thereof and to said driven member at the other end thereof.

3. A gear transmission as in claim 2 wherein the gear elements on the mainshaft are rotatably supported on the mainshaft and synchronizer clutch means connecting said mainshaft gear elements to the mainshaft.

4. A gear transmission as in claim 1 wherein the mainshaft is adapted to be connected to said driving member at one end thereof and said countershaft is adapted to be connected to said driven member at the other end thereof.

5. A gear transmission as in claim 1 wherein said support is of a one piece fabricated construction.

6. A gear transmission as in claim 5 wherein said support includes roller bearings mounted in said bearing openings.

7. A gear transmission as in claim 6 wherein said support is made from an aluminum alloy material.

8. A gear transmission adapted to transmit torque between a driving member and a driven member, said transmission comprising:

a mainshaft and a countershaft, said mainshaft being adapted to be connected to said driving member, said mainshaft and said countershaft having offset axes;

a transmission casing having axially spaced bearing support structures connected thereto;

meshing gear elements on said mainshaft and countershaft establishing torque flow paths;

a one-piece shaft-mounted support having first and second bearing openings therein; said shaft-mounted support being independent of said casing and freely movable relative thereto; and roller bearings mounted in said bearing openings and said mainshaft and said countershaft extending through said roller bearings and being supported by said support intermediate the ends of said mainshaft and said countershaft whereby the center-distance of said mainshaft and said countershaft is maintained as is the center-distance of said meshing gear elements notwithstanding gear tooth separating forces acting transversely with respect thereto.

* * * * *